July 24, 1962     H. B. BRISKIN     3,046,548
COLLISION WARNING DEVICE
Filed Aug. 13, 1958     2 Sheets-Sheet 1

INVENTOR
HERBERT B. BRISKIN
BY
ATTORNEY

INVENTOR
HERBERT B. BRISKIN
BY
ATTORNEY

3,046,548
COLLISION WARNING DEVICE

Herbert B. Briskin, Syosset, N.Y., assignor, by mesne assignments, to Sylvania Electric Products Inc., Wilmington, Del., a corporation of Delaware
Filed Aug. 13, 1958, Ser. No. 754,889
1 Claim. (Cl. 343—7.7)

My invention is directed toward collision warning systems.

I have invented a new type of radar system which, when carried by a moving vehicle, such as an airplane, can alert the operator of this vehicle to the presence of other nearby moving targets, such as other aircraft. More particularly, this system will indicate whether a target is approaching toward or receding from the vehicle. Thus, the operator is warned in advance of a possible collision and can take suitable protective steps.

Accordingly, it is an object of the present invention to provide a new and improved collision warning system.

Another object is to provide a new and improved continuous wave radar system which functions as a collision warning system.

Still another object is to utilize the Doppler effect in a collision warning system.

When a continuous alternating electromagnetic wave of fixed frequency is directed from a source, such as a moving vehicle toward a moving target and is reflected therefrom, the frequency of the reflected wave when received at the vehicle, will depend upon the relative direction of travel of the target with respect to the vehicle. More particularly, when the target is traveling toward the vehicle, the frequency of the reflected wave will be higher than that of the transmitted wave. Conversely, when the target is traveling away from the vehicle, the frequency of the reflected wave will be lower than that of the transmitted wave. This effect is known to the art as the Doppler effect, and the frequency difference between the transmitted and reflected waves is known as the Doppler difference frequency.

In accordance with the principles of my invention, a radar system is positioned at a station, such as a moving airplane, for the purpose of indicating the direction of travel of a moving target, such as an aircraft, with respect to this station.

The system comprises means for transmitting a continuous alternating electromagnetic wave of given frequency in such manner that this wave strikes the target and is reflected therefrom, and further includes means for receiving the reflected wave, the frequency of the reflected wave being higher than the given frequency when the target is approaching the station and being lower than the given frequency when the target is receding from the station.

First and second signals in phase quadrature with respect to each other are obtained from one of the transmitted and reflected waves and are supplied respectively to the first inputs of corresponding first and second mixers. The frequencies of these first and second signals are identical and equal to that of said one wave. A third signal is obtained from the other one of the transmitted and reflected waves and is supplied to the second inputs of both mixers. The frequency of the third signals is equal to that of the other wave.

Hence, the first and second mixers produce corresponding first and second output signals, both of which are at the Doppler difference frequency. These output signals are in phase quadrature when the target approaches the station and exhibit an additional relative phase of 180° when the target recedes from the station.

Means responsive to said output signals produces a visual indication that the target is either approaching toward or receding from the station and thus warns of a possible collision.

An illustrative embodiment of my invention will now be described with reference to the accompanying drawings wherein.

Figure 1:
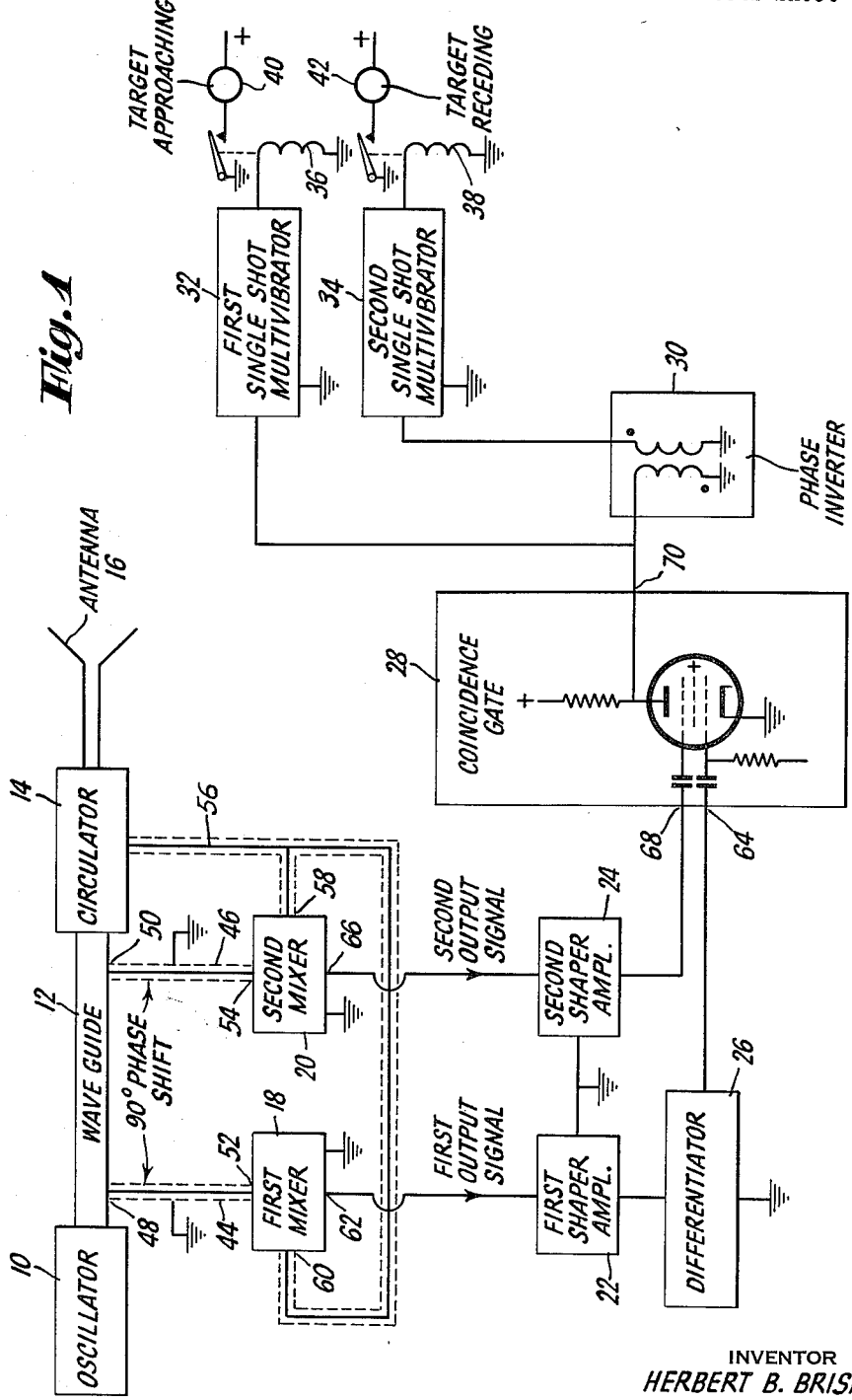
FIG. 1 is a block diagram of a radar system in accordance with the invention.

Referring now to FIG. 1, the output of continuous wave oscillator 10 is coupled through waveguide 12 and circulator 14 to the antenna 16. Antenna 16 functions as a combined transmitting and receiving antenna, and circulator 14 serves as a duplexer to prevent any interaction between the transmitted and received signals.

Transmission lines 44 and 46 interconnect respective separated points 48 and 50 on the waveguide (the separation between these points 48 and 50 is chosen to be one quarter wavelength at the oscillator frequency) to corresponding inputs 52 and 54 of first mixer 18 and second mixer 20. Circulator 14 is coupled to inputs 58 and 60 of mixers 18 and 20 by transmission line 56. The output 62 of mixer 18 is coupled through a first shaper amplifier 22 and a differentiator 26 to a first input 64 of a coincidence gate 28. Similarly, the output 66 of the second mixer 20 is fed through a second shaper amplifier 24 to a second input 68 of coincidence gate 28. The output 70 of the coincidence gate 28 is fed directly to a first single shot multivibrator 32 and is also supplied through a phase invertor 30 to a second single shot multivibrator 34. These two multivibrators 32 and 34 each control corresponding relays 36 and 38, these relays in turn controlling a target approaching indicator 40 and a target receding indicator 42 respectively.

This system operates in the following manner. Oscillator 10 produces a continuous alternating electromagnetic wave of given frequency (for example, a microwave frequency falling within the X-band) which is transmitted at antenna 16, strikes the moving target, and is reflected therefrom. The reflected signal is received at antenna 16.

First and second signals at the transmitted frequency but in relative phase quadrature are supplied from the waveguide 12 to inputs 52 and 54 of mixers 18 and 20. A third signal at the frequency of the reflected wave is supplied from the circulator 14 to inputs 58 and 60 of mixers 18 and 20.

Hence, first and second output signals at the Doppler difference frequency appear at outputs 62 and 66 of mixers 18 and 20 respectively. These signals originally of sinusoidal waveform are shaped into pulses having a rectangular waveform in shaper amplifiers 22 and 24. The rectangular pulses supplied from the second shaper amplifier are fed directly to input 68 of gate 28. The rectangular pulses supplied from the first shaper amplifier are differentiated in differentiator 26 to produce a pulse train of alternating positive and negative pulses, this pulse train being supplied to input 64 of gate 28. Gate 28 is so designed that it opens and passes those pulses in the pulse train supplied to its input 64 through to its output 70 only when the rectangular shaped pulses supplied at input 68 have positive polarity; when these rectangular shaped pulses have negative polarity, the gate is closed and no pulses appear at output 70.

The multivibrators 32 and 34 are of the single shot or monostable type which only respond to or are triggered by positive input pulses. When either multivibrator is triggered, its associated relay coil is energized for a period determined by the time constants of the multivibrator; i.e. the period in which the multivibrator is in its unstable state.

Hence, when the pulses appearing at the output 70 of gate 28 are positive, multivibrator 32 is triggered, relay 36 is energized and the target approaching lamp 40 is lit. Further, these positive pulses are inverted in the pulse inverter 30, so that negative pulses are supplied to multivibrator 34 and its relay 38 remains deenergized. Further, when the pulses appearing at the output 70 of gate 28 are negative, this process is reversed, the target receding lamp 42 is lit and the target approaching lamp 40 is dark.

Figure 2:
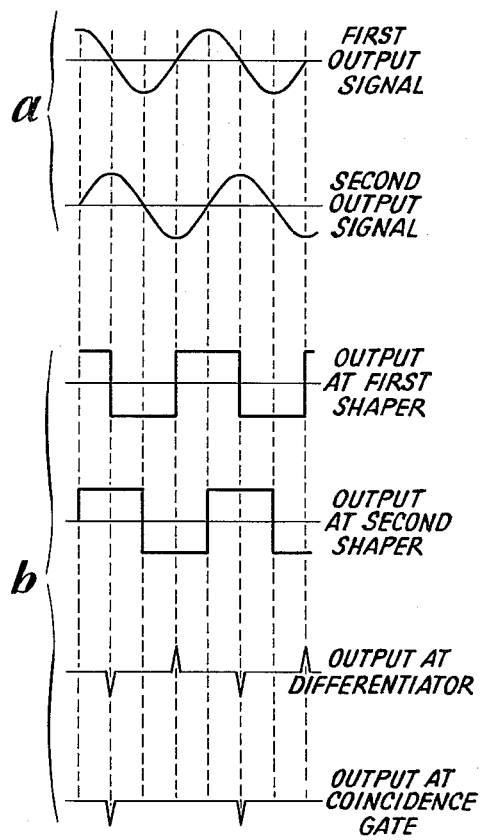
FIGS. 2a and 2b are illustrative signal waveforms of the circuit of FIG. 1 when the target is receding from the station.

When the target is approaching the station, as indicated previously, the frequency of the reflected wave is higher than that of the transmited wave. Under these conditions, the first output signal appearing at the output of the first mixer leads the second output signal appearing at the output of the second mixer by 90° in phase as shown in FIG. 2a. Further, the rectangular shaped pulses appearing at the output of the first shaper amplifier lead the rectangular shaped pulses appearing at the output of the second shaper amplifier by 90° in phase as shown in FIG. 2b. Moreover, as again shown in FIG. 2b, the phase relationships between the pulses supplied from the second shaper amplifier to the gate and the differentiated pulses supplied from the differentiator to the gate are such that only negative pulses pass through the gate and energize the target approaching lamp 40 in the manner previously indicated.

Figure 3:
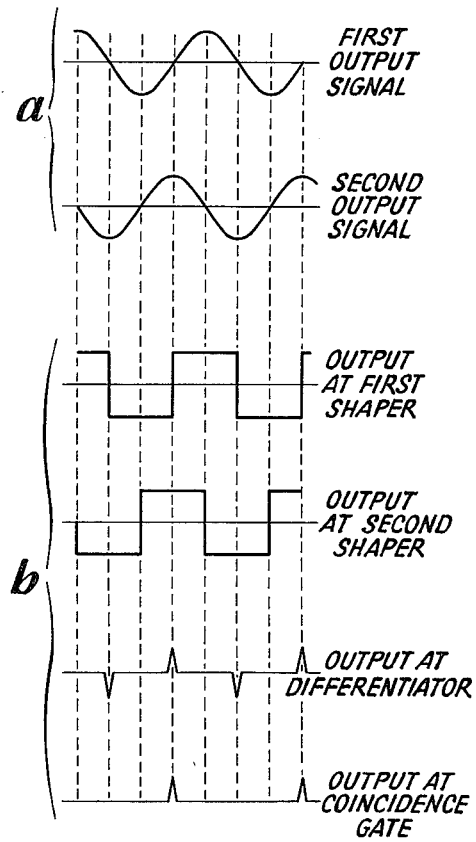
FIGS. 3a and 3b are illustrative signal waveforms of the circuit of FIG. 1 when the target is approaching the station.

When the target is receding from the station, the phase relationships of FIGS. 2a and 2b are reversed as shown in FIGS. 3a and 3b. From FIG. 3b, it will be apparent that only positive pulses pass through gate 28 and energize the target receding lamp 42.

Figure 4:
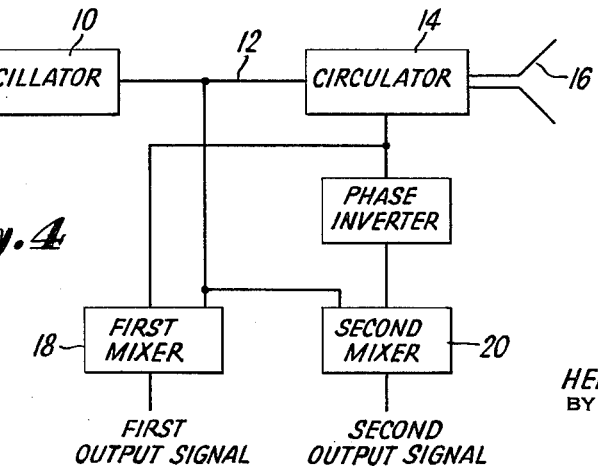
FIG. 4 is a block diagram of a modification of the system of FIG. 1.

In the system described above, two signals derived from the transmitted wave and in relative phase quadrature and one signal derived from the reflected wave are used as inputs to the two mixers. Alternatively, one signal derived from the transmitted wave and two signals derived from the reflected wave and in relative phase quadrature can be used as shown in FIG. 4. In either arrangement, the system will operate in the same manner as previously indicated.

The components of the system are conventional and well known to the art. For example, oscillator 10 can be a klystron oscillator; the mixers can be microwave diodes; the shaper amplifiers can be clippers or overdriven amplifiers; the differentiator can be a simple resistance capacitance differentiating network. The coincidence gate can be of the type shown employing a tube designated commercially as a 6AS6. The phase inverter can either be a pulse transformer as shown or a simple amplifier. The multivibrators can be of the Schmidt trigger type.

The volume of space covered by my system depends upon the antenna coverage pattern and the power of the transmitted wave. For certain applications, it is sometimes advisable to use several systems, as for example using one system to detect targets in a horizontal plane while using another such system to detect targets in a vertical plane.

What is claimed is:

A radar system positioned at a station for indicating the direction of movement, toward or away, of a moving target, said system comprising an antenna for transmitting a continuous alternating electromagnetic wave of a given frequency to said target and for receiving the wave reflected from said target, the frequency of the reflected wave being higher than said given frequency when said target is approaching said station and lower than said given frequency when said target is receding from said station, an oscillator for generating said continuous alternating electromagnetic wave of given frequency; a circulator provided with a first input coupled to said antenna and a second input, said circulator preventing interaction of said transmitted and received waves; a waveguide coupling said oscillator to the second input of said circulator, said waveguide having first and second taps spaced one quarter wavelength apart at the oscillator frequency; first and second mixers, each of said first and second mixers having a first input coupled to the first and second taps on said waveguide respectively and a second input coupled to the output of said circulator; first and second pulse shaping amplifiers coupled to the outputs of said first and second mixers respectively; a differentiating circuit coupled to the output of said first pulse shaping amplifier; a coincidence gate having first and second inputs coupled to the outputs of said differentiating circuit and said second pulse shaping amplifier respectively, a pulse appearing at the output of said coincidence gate when a voltage having a given polarity is applied to the second input of said coincidence gate simultaneously with the application of a pulse to the first input of said coincidence gate by said differentiating circuit; first and second multivibrators having their inputs coupled to the output of said coincidence circuit, said first and second multivibrator being responsive to input voltages of the same polarity, a phase inverter, said phase inverter coupling the output of said coincidence circuit to the input of said second multivibrator, and first and second indicating means coupled to the outputs of said first and second multivibrator respectively, said first or second multivibrator activating said first or second indicating means in accordance with the polarity of the pulse at the output of said coincidence circuit, the activation of said first indicating means signifying that a target is approaching said station and the activation of said second indicating means signifying that a target is receding from said station.

References Cited in the file of this patent
UNITED STATES PATENTS

| | | |
|---|---|---|
| 2,517,549 | Earp | Aug. 8, 1950 |
| 2,525,089 | Blumlein | Oct. 10, 1950 |
| 2,911,641 | Kohler | Nov. 3, 1959 |